Oct. 4, 1960 G. T. HEMMETER 2,954,699
WHEEL BALANCER

Filed July 22, 1955 4 Sheets-Sheet 1

INVENTOR.
GEORGE T. HEMMETER
BY Lothrop & West
ATTORNEYS

Oct. 4, 1960

G. T. HEMMETER 2,954,699

WHEEL BALANCER

Filed July 22, 1955

INVENTOR.
GEORGE T. HEMMETER
BY Lothrop & West
ATTORNEYS

United States Patent Office 2,954,699
Patented Oct. 4, 1960

2,954,699

WHEEL BALANCER

George T. Hemmeter, 10791 Magdalena Ave., Los Altos, Calif.

Filed July 22, 1955, Ser. No. 523,884

7 Claims. (Cl. 73—458)

My invention relates especially to means useful in determining the amount and location of unbalance in rotating wheels, especially automobile wheels complete with tire and other rotating equipment. A device of this sort is shown in my co-pending application entitled "Wheel Balancer," filed August 28, 1952, with Serial No. 308,911, now Patent 2,779,196.

A wheel balancer of this kind is temporarily applied to a vehicle wheel when it is jacked up, the wheel is rapidly spun and determination of unbalance is made. Following this, the wheel balancer is removed for use elsewhere. The determination of unbalance is usually made by an operator manipulating controls on the balancer while the balancer and wheel are rotating sometimes at a high rate of speed.

It is an object of my invention to provide a wheel balancer which is easily and quickly attached to a vehicle wheel and as readily detached therefrom.

Another object of my invention is to provide a wheel balancer which is easily and quickly centered with respect to the wheel being balanced.

Another object of my invention is to provide a wheel balancer in which the attaching means is not loosened or dangerously weakened during the balancing operation.

Another object of my invention is to provide a wheel balancer affording an indication to the operator during the balancing operation as to the appropriate manipulation of the controls.

Another object of the invention is to provide a mounting for a wheel balancer so that the wheel balancer can be appropriately attached to various vehicle wheels.

A still further object of my invention is, in general, to provide an improved wheel balancer.

Other objects, together with the foregoing, are attained in the embodiment of my invention described in the accompanying description and illustrated in the accompanying drawings, in which Figure 1 is, on the right-hand half, a front elevation of a wheel balancer constructed in accordance with my invention and applied to a vehicle wheel, a portion of the wheel being broken away; and is, on the left-hand half, a similar view but with a part of a covering shield broken away.

Figure 4:
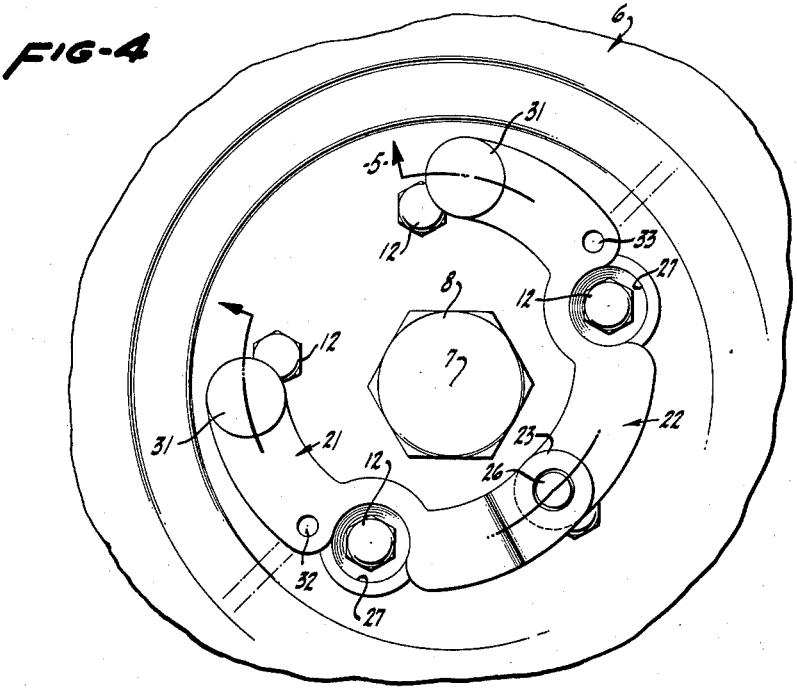
Figure 4 is a front elevation of a wheel balancer mount positioned on a typical wheel, portions of the wheel being broken away.
Figure 5:
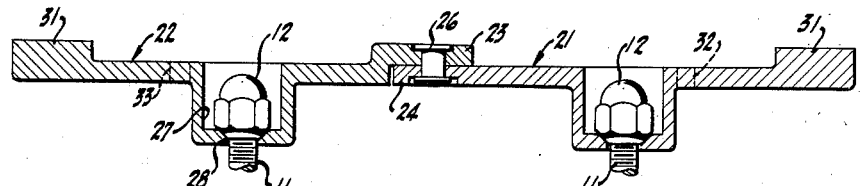
Figure 5 is a cross section of a development of the wheel balancer mount of Figure 4, the plane of the view and of the development being indicated by the line 5—5 of Figure 4.

While the wheel balancer of my invention can be incorporated in a number of different ways, depending upon its specific environment, it has been successfully made as illustrated herein. It is designed to be used in connection with a wheel 6 rotatable about an axis 7 and including a hub 8 having the customary brake drum 9 attached thereto and also including (Figure 4) a plurality of fastening studs 11 arranged around the axis 7. In the present instance the studs are five in number so that no two of the studs are exactly opposite each other but those that are substantially opposite each other lie on the two sides of the axis 7. The studs 11 are customarily provided with removable nuts 12 for holding the assembly in place.

Secured by the nuts 12 and mounted on the studs 11 is a wheel disc 13 terminating in a wheel rim 14 having an outer flange 16 and carrying the customary tire 17. It is for use with this typical structure that my wheel balancer is provided.

The diameter of the circle on which the studs 11 are mounted very often varies in practice from car to car or on successive wheels. Five studs are now customary but four and six are also used. I therefore provide a special wheel balancer mount as it is essential that the wheel balancer be very securely held in order to avoid its coming loose under the vibration and shock of an unbalanced wheel. For this reason, I preferably utilize a pair of the studs 11 as part of a securing structure.

On a five stud wheel, the nuts 12 on two of the approximately opposite studs are removed. Placed on the studs is a mount including a pair of mounting members 21 and 22 conveniently fabricated of metal. These are provided with overlapping portions 23 and 24 pierced by a hinge pin 26 forming a swinging connection between the portions 21 and 22. Each of these members is likewise provided wtih a depressed pocket 27 having an appropriate inwardly tapered hole 28 therethrough designed to fit freely around one of the studs 11. After the mount has been applied to two of the studs, the mating, outwardly tapered nuts 12 are replaced and tightened so that the mount is positively located with respect to the axis of the wheel for rotation.

In order to avoid the introduction of additional unbalance especially during rotation, each of the mounting members 21 and 22 is not only substantially planar but also is provided with a counterweight 31 as an extension disposed on the side of the adjacent hole 28 opposite to the hinge pin 26. In this way the center of gravity of the mount for all practical purposes is coincident with the axis of rotation 7. The swinging connection 26 permits the application of this mount to various wheels when the studs 11 are on different diameter pitch circles. The counterweights swing slightly as the connection 26 pivots so no particular error or new unbalance is introduced by the mount. By moving the counterweights 31 toward and away from each other around the pivot pin 26, the holes 28 are swung toward and away from each other so that they can accommodate studs 11 disposed at different distances apart.

The mount is likewise provided with means for receiving attaching devices for a wheel balancer. In the present instance, the mounting members 21 and 22 are especially formed to accommodate apertures 32 and 33 so located as to fall (in the ideal case) exactly on a diameter passing through the rotational axis 7. Since there can be swinging movement about the pin 26 before the studs 11 are engaged, the apertures 32 and 33, in fact, may not lie exactly on a diameter but the arcuate motion of such apertures due to the swinging motion is so slight and is so closely in a diametrical direction that for all practical purposes, with a negligible degree of error, the apertures 32 and 33 are, in effect, on a diameter passing through the rotational axis 7.

Figure 6:
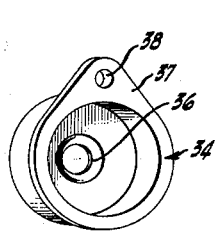
Figure 6 is a perspective view of a modified form of wheel balancer mount.

For wheels having an even number of studs 11, there is provided, as shown in Figure 6, a cup 34 having a hole therethrough to accommodate a stud 11 and having also a peripheral flange 37 in which an aperture 38 is eccentrically located with respect to the center of the hole 36. A pair of the devices in Figure 6 can be put on a pair of studs, such as 11, and by being appropriately rotated around the centers of the studs can be so disposed that the apertures 38 are substantially on a diameter for the reception of a wheel balancer. As an even number of studs permits diametrically opposed mounting, counterbalancing is unnecessary.

With the mount (Figure 4) in place on the wheel studs and with the apertures 32 and 33 on the wheel diameter, the wheel balancer 41 can be put in position. The balancer is substantially of the sort shown in my co-pending application. The balancer includes a frame 42 substantially symmetrical with regard to the axis 7 and provided at diametrically opposite points with a pair of apertures 43 having reinforcements 44 and through which pass cylindrical thumb nuts 46. These engage fasteners 47 in the form of rods having threaded ends engaged by the nuts 46 and having portions 48 passing through the apertures 32 and 33. Enlarged heads 49 abut the mount so that the fasteners 47 before being drawn up can be loosely accommodated and can be swung in the apertures 32 and 33. The fasteners 47 are not for the purpose of centering the wheel balancer on the wheel but are safety devices to ensure that the balancer 41 is firmly fixed on the rotating wheel against any possibility of accidental dislodgement during use, even though vibration from the unbalanced wheel is severe.

In the initial mounting procedure, the fasteners 47 are left relatively loose to permit the operation of means for quickly and easily centering the balancer 41 on the wheel 6 and upon any wheel within a wide range of sizes. The centering device is easily and quickly operated, is accurate and is not susceptible to loosening under vibration. The frame 41 of the wheel balancer includes a hub 51 around which a cam 52 is rotatable. The cam is symmetrical about the axis 7 and has a plurality of lobes 53 which are substantially identical so that a description of one applies to the others. Intermediate a pair of the lobes and disposed approximately on a diameter are a pair of levers 54 and 55 projecting slightly beyond the margin 56 of the wheel balancer frame 41 so that upon rotation of either or both of the levers 54 and 55 around the axis 7, relative to the wheel balancer frame, the cam lobes 53 are correspondingly rotated.

Figure 7:
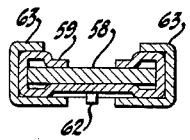
Figure 7 is a cross section, the plane of which is indicated by the line 7—7 of Figure 3.

Each of the lobes acts on an associated mechanism having a radial component of movement relative to the balancer frame. Rubbing on the surface of the lobe is a hardened block 57 serving as a cam follower and being joined to the remainder of a radial arm 58 by a metal clip 59. This is folded over and encompasses the block 57 and the arm 58 holding them in radial alignment, as shown in Figure 7. Customarily, the clip 59 is fastened to the hardened end 57 whereas the arm 58 is removable from the clip 59 by a snap action.

Figure 3:
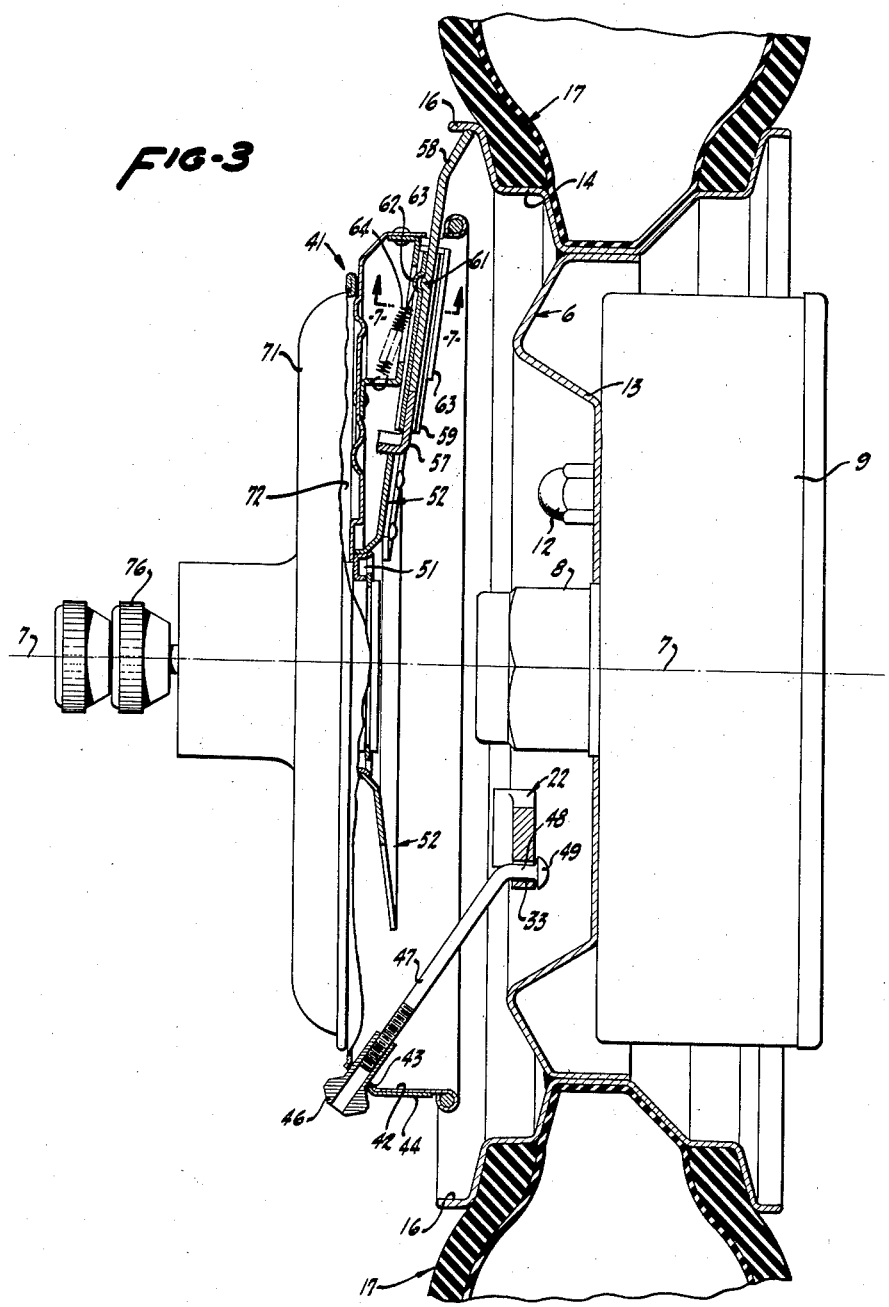
Figure 3 is a cross section in planes indicated by the lines 3—3 of Figure 2.

As shown especially in Figure 3, the arm 58 has a slight projection 61 engageable with a dent 62 in the clip 59. Upon exertion of sufficient separating force between the arm 58 and the sleeve 59, the projection 61 springs out of the depression 62 and the arm 58 can be removed. By the reverse motion, a new arm can be snapped into place. This is especially useful in inserting arms 58 of different lengths or configurations for different diameter wheel rims 16. All four of the arms 58 in use at any one time are of the same length.

To insure that the arm 58 has rectilinear radial translation with regard to the balancer frame 41, the frame is provided with a guide bracket 63 having inturned flanges encompassing the clip 59 and serving as a guide and as a support for the arm 58. The arm is normally impelled radially inward in its rectilinear path so that the follower 57 bears against the cam lobe 53 by a coil spring 64 having one end engaged conveniently in an aperture in the depression 62, and having the other end appropriately fastened to part of the guide bracket 63.

Although the force of the spring 64 tends to thrust the arm 58 radially inwardly, the tangent of the angle of rise of the cam lobe 53 is less than the coefficient of friction between the cam lobe and cam follower, hence a radial force acting on the arm in a direction toward the rotational axis 7 imparts no rotation whatsoever to the cam 52. Since this cam slope is relatively flat and since there is no possibility of rotation of the cam by inward pressure on the arm 58, the interrelationship of the arm and of the cam is termed "non-reversing" or "non-overhauling." With this structure, all four arms 58 are simultaneously projected and withdrawn simply by rotating the levers 54 and 55 about the axis 7.

Figure 2:
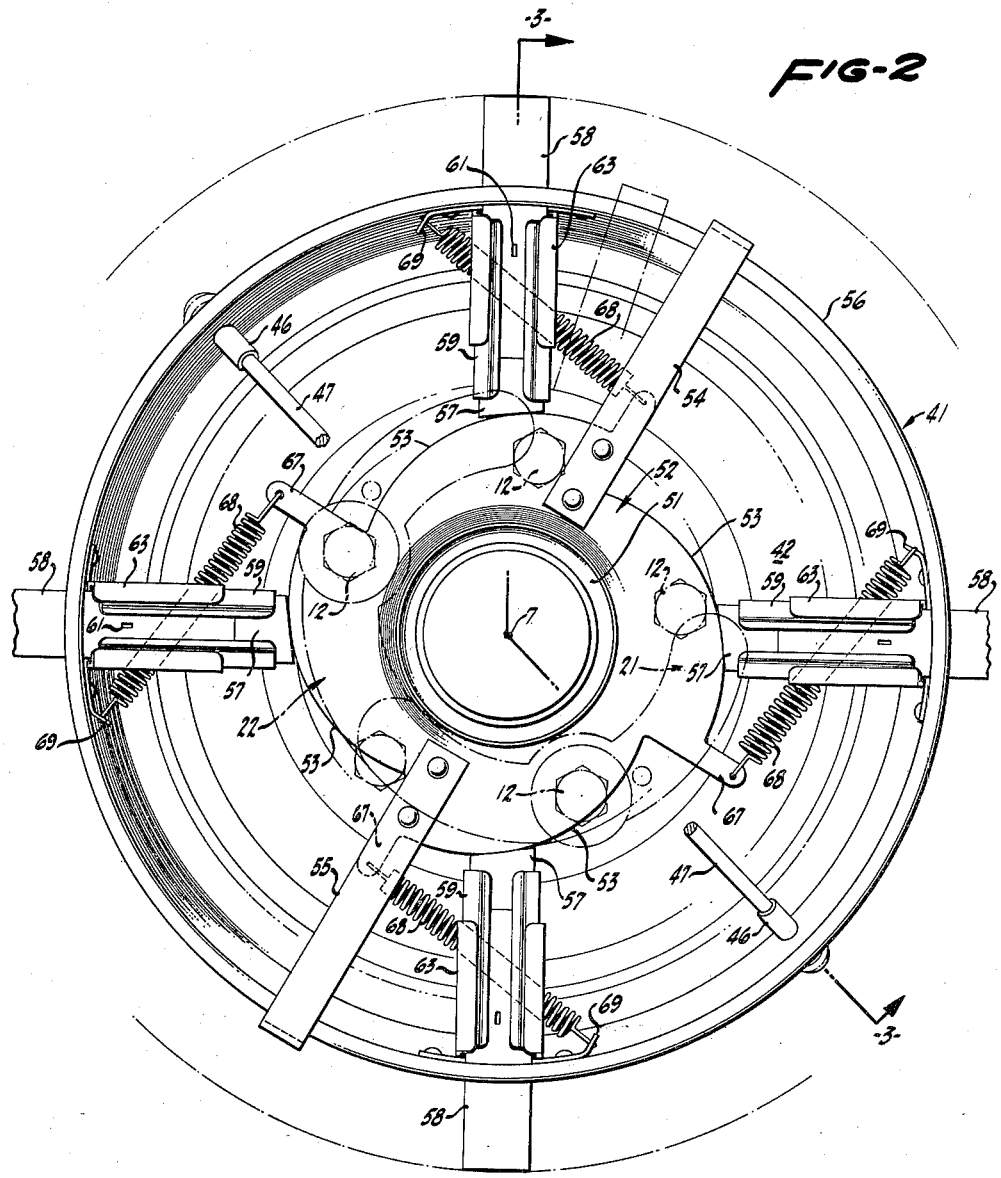
Figure 2 is a rear elevation of the wheel balancer illustrated in Figure 1, some portions being broken away to reduce the size of the figure and certain adjacent parts being shown in phantom, broken lines.

It is preferred that the cam mechanism always exert a projecting force on the various arms and consequently each cam lobe 53 is provided with an extension 67 to which one end of a spring 68 is secured. The other end of the spring is hooked into an ear 69 forming part of the guide bracket 63. Since the force of the spring is sufficient to rotate the cam 52 and to project the arm 58 against the urgency of the spring 64, the maneuver in mounting the balancer is for the operator to rotate the arms 54 and 55 clockwise, as seen in Figure 2, so that the arms 58 are all retracted, the levers 54 and 55 being held by the operator against the urgency of the springs 68.

With the balancer loosely mounted on the wheel by the fasteners 47, the operator releases the levers 54 and 55. The springs 68 in contracting rotate the cam 52 and simultaneously project all of the arms 58 against the out-turned flange 16 of the wheel. Since all of the arms 58 and their operating mechanisms are identical, the balancer is thus quickly centered and firmly held on the wheel to be balanced. Thereupon the thumb nuts 46, previously left in loose condition, are tightened as a safety precaution. When the wheel is then rotated, even though it is highly unbalanced and subject to a great deal of vibration, the arms 58 hold the wheel balancer well and accurately centered on the axis 7.

If vibration is effective to move the balancer such that clearances develop, the constant urgency of the springs 68 to rotate the cam 52 in a counter-clockwise direction (as seen in Figure 3) imposes a still further tightening urgency upon the arms 58. The arms 58 all have some weight and since they are not centrifugally restrained tend to be forced outwardly tightly against the flange 16. Any radially outward movement of the arms is immediately followed by corresponding rotation of the cam 52 so that contact is always maintained between the cam lobes 53 and the followers 57. Because of the non-reversing or non-overhauling nature of these cam lobe and cam follower contacting surfaces, the arms cannot reverse the cam rotation. The arms cannot be released until an operator swings the levers 54 and 55 to rotate the cam in a direction so that the relatively weak springs 64 can then withdraw the arms 58.

The practice in removing the balancer is first to release and remove the thumb nuts 46 and then to remove the balancer by rotation of the levers 54 and 55 so as to allow the springs 64 to retract the arms. The mount is removed afterward by removing the stud nuts 12.

As described in my above mentioned patent, the mechanism of the balancer includes, in addition to the frame 41, a shield 71. This is usually an opaque metal plate appropriately centered on the frame 41 about the axis 7 and with the frame forming a substantially enclosed compartment 72. Within the compartment is a weight 73 in the form of an approximate rectangle movable with respect to the frame 41 in a plane normal to the axis 7. This movement is effectuated by a threaded shaft 74 fixed in the weight and passing through the balancer hub 51. Within the hub is mechanism (not shown) for translating the screw 74 axially of its length upon the occurrence of relative rotation between the balancer frame 41 and a control knob 76 conveniently disposed for use by the operator.

Figure 1:
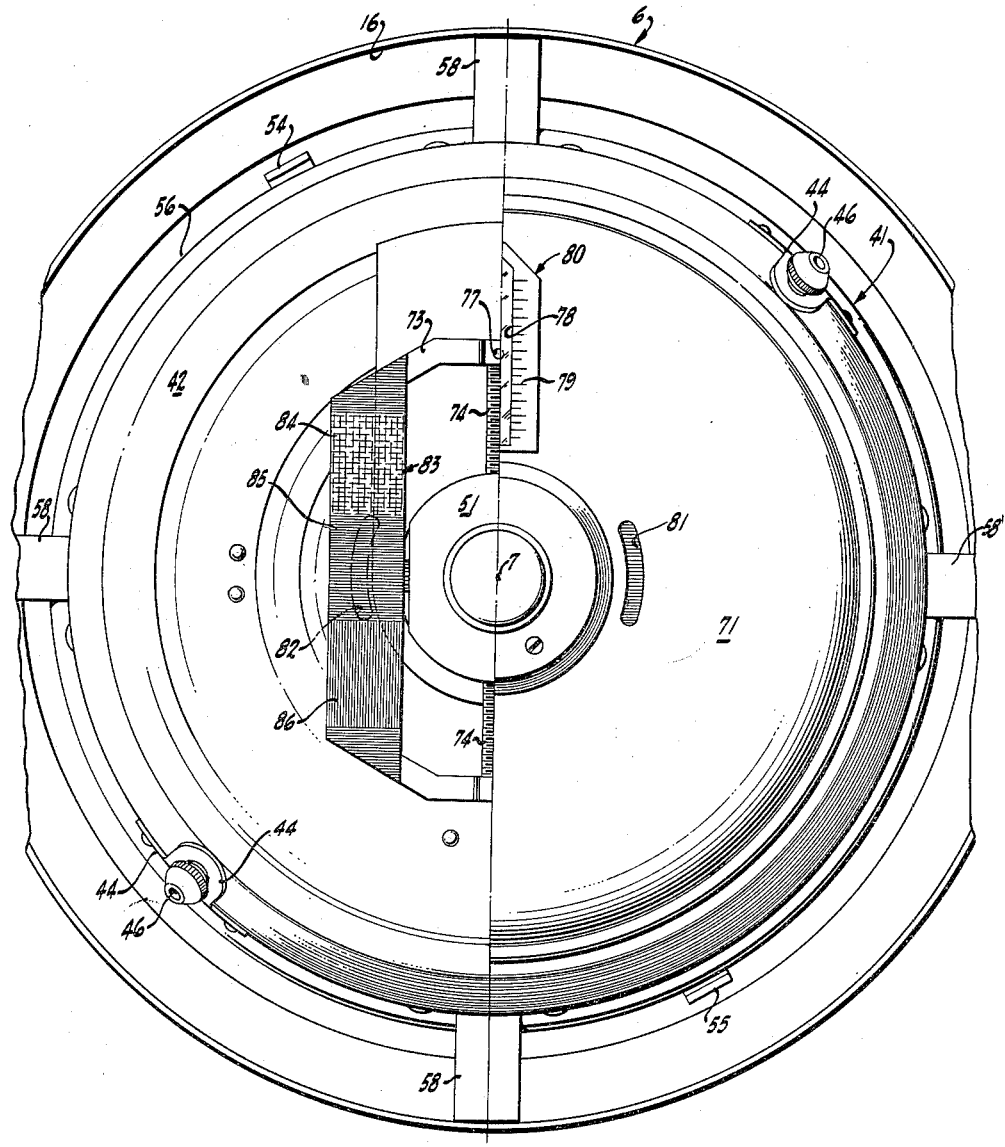

During rotation of the wheel balancer frame 41 with the wheel 6, the operator by grasping the knob 76 and holding it stationary effectuates a traversing motion of the balancing weight 73 from its central position, as shown in Figure 1, into either of two extreme positions, one with the weight displaced toward one end of a diameter containing the screw 74 and the other displaced toward the other end of that diameter.

The position of the weight is normally indicated by a button 77 on the weight 73 which is visible through or projects through a slot 78 in the otherwise opaque shield 71 and can be related to a scale 79 inscribed on an indicating arrow 80 fastened to the shield 71. As set forth in my above-identified patent, the arrow 80 indicates externally the rotated position relative to the base plate of the balancing weight 73 which is the rotated position for attachment of a counterweight to effect balance. This indicator 80 is adequate when the wheel balancer is stationary but when the entire structure is revolving rapidly during a balancing operation, the scale 79 cannot be read and the position of the button 77 is difficult if not impossible to detect. In the beginning of a balancing operation, the operator detects unbalance by observation of wheel vibration but does not know in what position the compensating weight 73 may happen to be. This is particularly true as the weight 73 may previously have been displaced at random.

For that reason, I provide a means effective during rotation of the balancer for apprising the operator of the position of the weight 73. The otherwise opaque shield 71 is preferably provided with a pair of windows 81 and 82, preferably arcuate in configuration and of a relatively limited extent but affording a view through the shield 71 into the interior of the compartment 72 containing the weight 73. Preferably, the windows 81 and 82 are at the same radius from the axis 7.

Conveniently situated on each of the rectilinear bands 83 constituting parts of the weight 73 is a series of indicia 84, 85 and 86. Each of these indicia is preferably in the nature of a color different from the others and of a linear extent substantially the same as that of one of the windows 81 or 82. The colors which term herein includes black and white can be applied to a strip 83 in any convenient way, either by the application of separate facing material thereto, by painting theron, by chemical dying or otherwise. Furthermore, while the different indicia 84, 85 and 86 are referred to as different "colors" they can as well be different textures of the strip 83 or some part thereof, such as burnished metal, dull plating, and the like. Conveniently, in practice, the indicium 84 is painted yellow, the indicium 85 is painted blue, while the indicium 86 is painted red. Since the weight 73 is symmetrical, similar indicia show simultaneously through the two windows 81 and 82.

When the device is stationary (as shown in Figure 1), the operator can read the scale 79 and by observing the button 77 can determine that the weight 73 is in mid-position. He likewise can make the same determination by observing through the windows 81 and 82 that the blue indicia 85 are all that is visible, the other indicia 84 and 86 being then masked by the otherwise opaque shield 71. When the balancer is rotating at a high rate of speed, while the operator cannot detect the position of the button 77 with any accuracy, he can still observe what then appears to be a blue circle or blue band or blue ring due to the rotation of the blue indicia 85 revealed through the windows 81 and 82. He then knows that the weight 73 is centered.

If he decides that the weight should be shifted in one direction, he operates the control knob 76 appropriately and while he still cannot read readily the position of the button 77 with respect to the scale 79, he still can observe the direction of the shift because, for example, the yellow indicia 84 begin to appear in the windows 81 and 82. Even though the blue indicia 85 partly remain, there is some yellow introduced into the apparent ring made by the rotating colors. What initially was a pure blue ring takes on a greenish tinge. If the weight 73 is moved even farther in the same direction, all of the blue indicia 85 is displaced to a position underneath the masking shield 71 and all of the yellow indicia 84 then appears beneath the windows 81 and 82. The operator then knows when the apparent circle is yellow that he has reached one end of traverse of the weight 73. He can gage the amount of intermediate traverse by the shade of color between pure blue and yellow.

Similarly, if the control knob 76 is maneuvered in the opposite manner, the weight 73 is shifted in the opposite direction from its intermediate position, as shown in Figure 1, and the red indicia 86 begin to appear in the windows 81 and 82. What initially was a pure blue ring then begins to take on a purplish tinge which becomes more and more pronounced as the blue retreats and the red advances. When the red indicia are halfway across the windows 81 and 82 or substantially so while half the blue indicia 85 remains, there is a purple ring apparent to the operator. Final movement of the weight 73 to dispose all of the red indicia 86 beneath the windows 81 and 82 produces a pure red ring so that the operator then knows that he is at the other or opposite extreme motion of the weight 73.

If the shield 71 itself is colored, then the distinctions previously described still obtain, but the appearances to the operator are uniformly diluted by the shield color.

By appropriately observing the color of the apparent ring during rotation of the balancer, the operator can tell the instantaneous position of the weight 73 and by properly operating the knob 76, he can move the weight from any position as indicated by the particular color of the apparent ring into any other selected position as indicated by the then color of the apparent ring. In practice, after a short time, operators become adept in correlating the instantaneous color and intensity with the instantaneous position of the weight 73. They no longer have to determine by trial and error in which direction the weight 73 must be moved to get it from an unknown rotating position to the desired rotating position. The process of shifting the weight 73 in order to effectuate balance is thus greatly facilitated.

What is claimed is:

1. A wheel balancer adapted to rotate as a whole with a wheel being balanced comprising a frame symmetrical about an axis, a balancing weight, means mounting said balancing weight on said frame for movement in a plane normal to said axis, means rotatable relative to said frame for so moving said balancing weight, an opaque shield on said frame covering said balancing weight, said shield having a window therein overlying part only of said weight, and a series of different colored indicia on said balancing weight exposed sequentially through said window during said movement of said balancing weight, each of said indicia having substantially the same extent as said window.

2. A wheel balancer adapted to rotate as a whole with a wheel being balanced comprising a frame symmetrical about an axis, a shield symmetrical about said axis and fixed relative to said frame to form a compartment, said shield having therein a window of limited extent, a balancing weight within said compartment and mounted for movement relative to said frame, means rotatable relative to said frame about said axis for so moving said balancing weight, a series of different colored indicia within said compartment, each of said indicia being substantially of said extent, and means for moving said indicia in sequence from positions away from said window into a position in said window in unison with said movement of said balancing weight.

3. A wheel balancer adapted to be rotated as a whole with a wheel being balanced comprising a frame symmetrical about an axis, a balancing weight, means rotatable relative to said frame for moving said balancing weight on said frame, different colored indicia on said balancing weight, and an opaque shield on said frame overlying said indicia and having means of substantially the same extent as individual ones of said indicia for exposing to view successive ones of said different colored indicia in accordance with movement of said balancing weight on said frame.

4. A wheel balancer for attaching to a wheel to be balanced and bodily rotatable therewith comprising a frame symmetrical about an axis, a shield symmetrical about and having a portion in a plane normal to said axis and fixed relative to said frame to form a compartment, said portion having a window therein, a balancing weight in said compartment and having a part movable beneath said window, and means on said part forming a series of different colored indicia, each of said indicia having substantially the same extent as said window.

5. A device for attaching to a wheel to be balanced and adapted to be mounted thereon for rotation as a whole with said wheel about an axis, comprising a frame substantially symmetrical about said axis, opaque means forming a shield normal to said axis, said shield having a window therein, a balancing weight under said shield movable into different positions on said frame, and a series of different color indicia mounted on said weight, each of said different color indicia having substantially the same extent as said window for displaying different color indicia through said window in accordance with said different positions of said weight.

6. A wheel balancer rotatable as a whole with a wheel being balanced comprising a frame symmetrical about an axis, a balancing weight, means mounting said balancing weight on said frame for movement in a plane normal to said axis, means rotatable relative to said frame for so moving said balancing weight, means carrying a series of different colored indicia, each of said indicia having a predetermined extent, means moving said carrying means in unison with said balancing weight, and an opaque shield overlying said series of indicia, said shield having a window therein substantially of said extent and overlying part only of said series of indicia.

7. In a wheel balancer adapted to be rotated as a whole about an axis of a wheel being balanced, an opaque shield on said balancer and rotatable therewith about said axis, said shield having a window therein, a balancing weight mounted on said balancer and movable into different positions thereon, and means having different color indicia thereon and operatively connected to said weight for displaying said different color indicia through said window in accordance with said different positions of said weight, each of said indicia being substantially of the same extent as said window.

References Cited in the file of this patent

UNITED STATES PATENTS

| | | |
|---|---|---|
| 670,324 | Leverkus | Mar. 19, 1901 |
| 1,534,341 | Bernotow | Apr. 21, 1925 |
| 1,629,680 | Cooke | May 24, 1927 |
| 1,765,207 | Coffee | June 17, 1930 |
| 1,807,752 | Poster | June 2, 1931 |
| 1,866,252 | Dodge | July 5, 1932 |
| 1,932,900 | La Brie | Oct. 31, 1933 |
| 2,372,891 | Fenton | Apr. 3, 1945 |
| 2,402,041 | Greenleaf et al. | June 11, 1946 |
| 2,662,396 | Hunter | Dec. 15, 1953 |
| 2,675,200 | Wohlforth | Apr. 13, 1954 |
| 2,680,974 | Hunter | June 15, 1954 |
| 2,806,402 | Ferris | Sept. 17, 1957 |